United States Patent Office 3,503,121
Patented Mar. 31, 1970

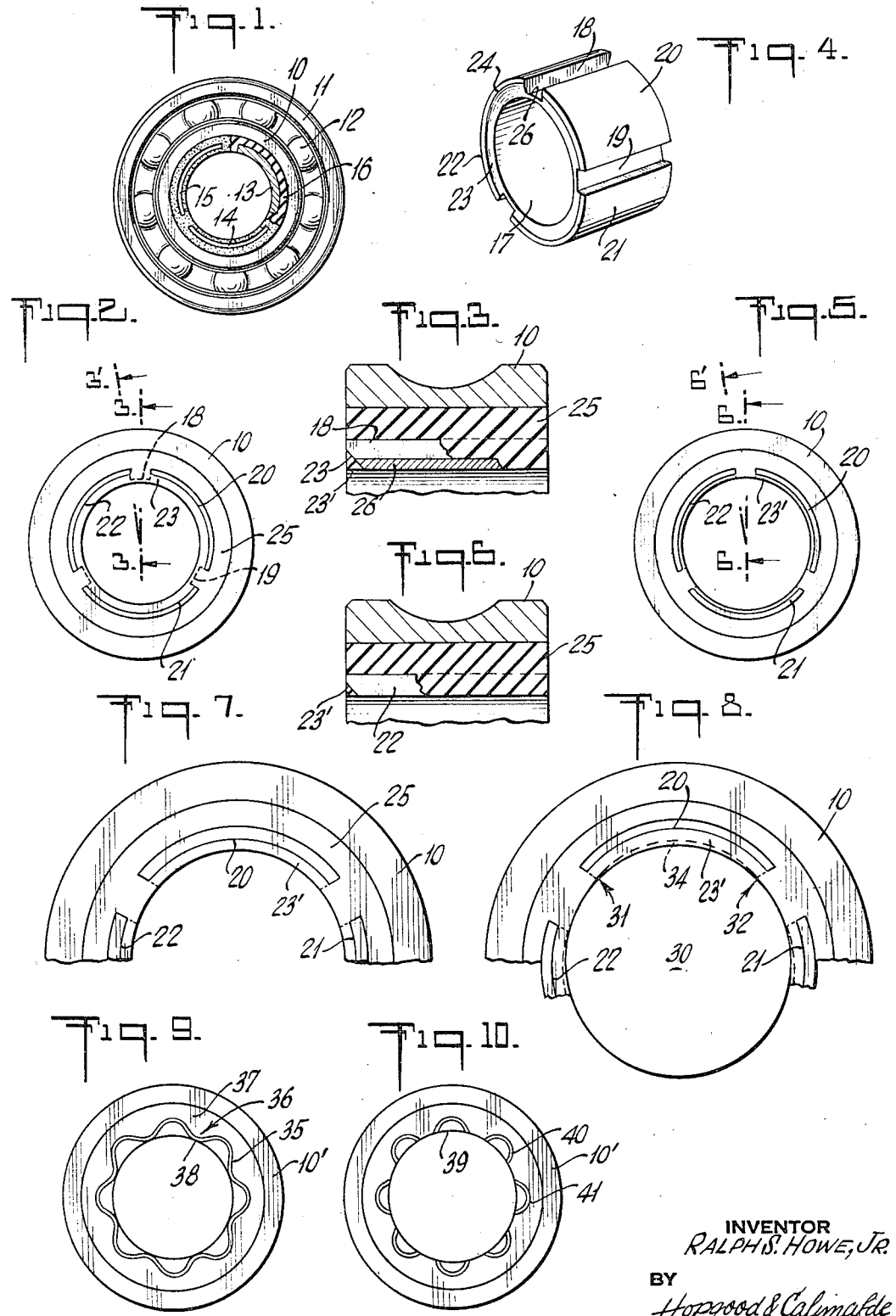

3,503,121
SELF-LOCKING BEARING RING
Ralph S. Howe, Jr., New Britain, Conn., assignor, by mesne assignments, to Textron Inc., Providence, R.I., a corporation of Delaware
Filed Nov. 9, 1967, Ser. No. 681,627
Int. Cl. B21d *53/12*
U.S. Cl. 29—527.2                                7 Claims

ABSTRACT OF THE DISCLOSURE

The invention contemplates fabrication of a resilient self-locking structure in the bore of a ring to be mounted on a shaft. The structure involves an annulus of elastomeric material bonded to the bore and having a bore of diameter to encounter interference with a given shaft diameter, on which the resiliently lined ring is to be mounted. Plural angularly spaced metal feet are embedded in the elastomeric material, the feet being in radial clearance relation with the bearing ring bore and having inner surfaces exposed at the bore of the elastomeric material. Thus, the interference encountered upon shaft insertion develops resiliently loaded radially outward displacement of the clamping feet.

---

This invention relates to a method and apparatus involving a self-locking mechanism for attachment of a ring, such as an inner-bearing ring, to a shaft, particularly for light-duty applications.

In certain applications, it is desired that collars, bearing rings and the like be completely self-contained and adaptable, upon axial insertion, to resiliently hug a shaft. It is known to make such structures utilizing a hub or bushing of elastomeric material, which may or may not be bonded in the bore of the ring to be mounted. However, such devices are subject to the difficulty that they are entirely too resiliently mounted and have insufficient bite upon the shaft to assure against angular creep, due to planetary action in the presence of even the lightest loads.

It is, accordingly, an object of the invention to provide an improved structure of the character indicated.

It is a specific object to meet the foregoing object with a structure in which metal feet may be an instrumentality for resiliently loaded self-locking contact with and mounting of a ring, such as a bearing ring, upon a shaft.

Another specific object is to provide a self-locking or self-mounting bearing ring or the like with plural uniform metal feet which are resiliently positioned and which inherently position the ring concentrically upon the shaft to which it is mounted.

Still another object is to meet the foregoing objects with a structure in which an interference fit between resilient clamping feet in a self-locking bearing ring may (1) be relied upon to develop relatively strong resistance against planetary creep, in the presence of loads, and (2) at the same time be effectively applicable to a relatively wide tolerance range of shaft diameters.

Another object is to provide a method for achieving a structure meeting the foregoing objects.

Other objects and various further features of novelty and invention will be pointed out or will occur to those skilled in the art from a reading of the following specification in conjunction with the accompanying drawings. In said drawings, which show for illustrative purposes only, preferred forms and methods of the invention:

FIG. 1 is a view in end elevation of a ball bearing to which resilient mounting structure of the invention has been applied;

FIG. 2 is a similar end elevation view of the inner bearing ring of FIG. 1 in an early formative step, i.e., prior to completion of the method of the invention;

FIG. 3 is an enlarged fragmentary view in section, taken in the plane 3—3 of FIG. 2 and partly broken away to reveal the section at the radial plane 3' of FIG. 2;

FIG. 4 is a view in perspective of a clamping-ring structure utilized in the method of the invention and prior to its embodiment and treatment according to that method;

FIG. 5 is a view similar to FIG. 2 but illustrating the structure after performance of method steps of the invention;

FIG. 6 is an enlarged fragmentary sectional view similar to FIG. 3 but illustrative of the performance of the method step illustrated in FIG. 5, the section of FIG. 6 being taken in the plane 6—6 of FIG. 5, and part of that section being broken away to reveal the section at the radial plane 6' in FIG. 5;

FIG. 7 is an enlarged fragmentary end view in elevation of the structure of FIG. 5, before application to a shaft;

FIG. 8 is a view similar to FIG. 7 showing radial displacements occasioned by interference when fitting the shaft to the structure of FIGS. 5 and 7; and FIGS. 9 and 10 are similar end-elevational views illustrating a modification, FIG. 9 being taken prior to completion of the method, and FIG. 10 representing the finished structure after performing the method of the invention.

Briefly stated, the invention contemplates fabrication of a resilient self-locking structure in the bore of a ring to be mounted on a shaft. The structure involves an anulus of elastomeric material bonded to the bore and having a bore of diameter to encounter interference with a given a shaft diameter, on which the resiliently lined ring is to be mounted. Plural angularly spaced metal feet are embedded in the elastomeric material, the feet being in radial clearance relation with the bearing ring bore and having inner surfaces exposed at the bore of the elastomeric material. Thus, the interference encountered upon shaft insertion develops resiliently loaded radially outward displacement of the clamping feet.

According to the method of making such structure, the clamp feet are defined by a single rigid clamp ring of initial inner dimensions which interfere with the shaft diameter. This single clamp ring has outer dimensions to fit with radial clearance within the bore of the ring body, and plural angularly spaced grooves of depth extending to less than the diameter of the shaft. The ring is concentrically embedded within and bonded by elastomeric material within the bore of the bearing ring body. A subsequent boring operation on the resulting composite structure is performed to a diameter sufficient to sever the clamped ring at the groove-bottom locations, thereby defining plural resiliently mounted clamp feet within the ring body.

Referring to FIG. 1 of the drawings, the invention is shown in application to an antifriction bearing having the usual inner and outer race rings 10–11 with plural spaced antifriction elements, such as balls 12, riding raceways in the radially facing surfaces of the rings 10–11. The invention provides a self-locking or clamping structure within the bore of the inner bearing ring 10. It suffices in connection with FIG. 1 to state that this clamping structure involves, for the form shown, three equally angularly spaced metal clamping feet 13–14–15 of relatively substantial arcuate extent and concentrically positioned, at relatively close angular spacing, within the bore of the inner ring 10, the same being embedded in elastomeric material 16.

FIGS. 2 to 8 illustrate the method used in the fabrication of the self-locking structure of FIG. 1. Such method involves selection of a rigid unitary clamp-ring structure as illustrated in FIG. 4. This structure is shown as a cylindrical annulus, as of steel, having a continuous cylindrical bore 17 between its axial ends, and having an outer cylindrical surface which is interrupted by angularly spaced relatively narrow channels or grooves 18–19, thus defining relatively angularly extensive body elements, as at 20, between grooves 18–19. The body element 20 eventually becomes one of the jaws or feet in the clamping structure; the other two jaw or foot elements are identified at 21–22 in FIG. 4. For the form shown, the end faces of the clamping ring of FIG. 4 are provided with bevels or chamfers, as at 23 at the bore 17 and extending to an outer diameter or limit 24 which exceeds the shaft diameter on which the ring is to be mounted. Further, the depth of the grooves 18–19 is to an extent representing a diameter less than the shaft diameter on which the self-locking device is to be mounted.

The ring of FIG. 4 is concentrically positioned within the inner bearing ring 10 and this fact or condition is illustrated in FIG. 2. The two ring structures in such concentric relation are then placed in a mold, so that elastomeric material 25 may fill all voids between the clamp-ring bore and the inner bearing-ring bore. The resultant structure is best illustrated in FIG. 3 wherein it will be seen that the bottoms of the grooves (18) define, with the bore of the clamping ring of FIG. 4, thin connecting elements or bridges, identified at 26 in FIG. 3. These connecting elements are ultimately removed by a boring, turning or grinding operation to enlarge the bore of the composite structure to a diameter just less than the ultimate shaft diameter. The extent of the interference with the shaft diameter is predetermined, based on the desired resiliently loaded displacement of feet 20–21–22, thickness and stiffness of the elastomeric material, radial loading of the bearing, and other factors, as will be understood.

After performing the boring, turning or grinding operation, the composite structure has the appearance displayed in FIG. 5 wherein body elements 20–21–22 have been severed because the bridge material 26 which previously connected them has now been removed. The bore is concentric with the inner bearing ring, and all feet or body elements 20–21–22 have precisely the same radius, being a radius slightly less than that of the shaft on which the self-clamping structure is to be mounted. Moreover, all body elements or feet 20–21–22 are uniformly resiliently supported by precisely the same radial thickness of the elastomeric material within the bore of the inner bearing ring 10. The enlarged view of FIG. 6 displays the condition of the locking structure after performing these method steps.

FIGS. 7 and 8 illustrate displacements which occur upon mounting the inner bearing ring 10 and its self-clamping structure on a shaft 30 of diameter which in FIG. 8 is shown to have exaggerated interference fit with the bore of the composite self-locking structure. It will be seen that this interference fit necessarily involves uniform radially outward displacement of each of the clamping feet 20–21–22 by reason of complaint yielding of the body of elastomeric material 25, and that by reason of the smaller finish radius on each of the clamping feet 20–21–22 as compared with the shaft radius, there necessarily results for each of these feet two spaced essentially-line contacts 31–32 with the shaft surface. The nature of resilient loading of each foot (20) on the shaft is to develop strong biting action at 31–32 to resist creep, to stabilize radial orientation of the ultimate bearing, and better to sustain stable quiet running of whatever mechanism is mounted by the bearing.

It will be observed furthermore that by having formed the chamfers or bevels at 23 for each axial end of the bore 17, the potting of elastomeric material necessarily fills the annular void inside the chamfer or bevel 43. This is illustrated in enlarged detail at 23′ in FIG. 3. This filling survives as a circumferentially continuous seal structure even after performing the boring, turning or grinding step of the method, i.e., even after the bridge connections 26 between clamp-feet 20–21–22 have been severed. By providing such a circumferentially continuous edge, there is assurance against the entry of foreign matter into the clamping structure, and there is assurance that the clearance developed between the shaft and the center of each clamping foot, as at 34 (FIG. 8), will be protected against entry of foreign matter and moisture, so that prime reliance at all times can be had upon the grip at 31–32 to sustain and hold the ring mounting upon the shaft.

FIGS. 9 and 10 illustrate a modification wherein the rigid clamp ring which ultimately defines the spaced clamping feet or jaws is itself of corrugated construction, such as corrugated steel with longitudinal flutings. The corrugated clamp ring of FIG. 9 is identified 35 and is seen to provide plural angularly spaced outwardly facing grooves 36; the depth of such grooves is preferably to a diameter less than the ultimate shaft diameter to which the composite structure is to be mounted, and the corrugated ring 35 is potted or embedded in elastomeric material 37 in the manner previously described. Once potted, the composite structure is subjected to boring, turning or grinding operations to sever individual undulations of the ring 35 at the groove bottoms, as at location 38 in FIG. 9. The resultant structure is illustrated in FIG. 9 after performing the boring or grinding operation. This finishing operation enlarges the bore 39 to a diameter just less than the ultimate shaft diameter upon which the composite structure is to be mounted, and is seen to provide plural severed feet 40–41, as inverted U-shaped structures. The arm extremities of each U face radially inwardly and are finished with a radius (about the axis of the composite structure) of lesser extent than the ultimate shaft diameter to which the device is to be mounted. This assures that for mounting to such a shaft, all feet 40–41 will be uniformly radially outwardly displaced, and two angularly spaced lines of contact will be developed for each resilienty loaded foot 40–41, in the manner described for the feet 20–21–22 in the arrangement of FIGS. 1 to 8.

It will be seen that I have described a basically simple and improved self-locking structure and method, particularly applicable to any ring structure to be mounted upon a shaft, and having special application for the case of antifriction bearings. This structure provides inherent symmetry of support and enhanced grip on a shaft, through uniformly applied resilient loading that is completely concentric. The support and grip are effective over relative larger a tolerance range for shaft diameter, and quiet running is promoted. Moreover, the nature of the grip is such as to provide inherently less tendency to develop less fretting corrosion between a shaft and bearing bore, as compared with conventional slip-fitted locking devices applied to bearings.

Although the invention has been described in connection with preferred forms and methods, it will be understood that modifications may be made without departing from the scope of the invention as defined in the claims which follow.

What is claimed is:

1. The method of making a self-locking ring for attachment to a shaft, which comprises selecting a rigid ring body of bore diameter to clear the shaft diameter, selecting a rigid clamp ring of inner dimensions which interfere with the shaft diameter and outer dimensions to fit with radial clearance within the bore of said ring body, said clamp ring having plural angularly spaced grooves of depth extending to less than the diameter of the shaft, embedding said clamp ring in elastomeric material and in the bore of said ring body, and then boring the resulting composite structure to a diameter sufficient to sever said clamp ring at groove-bottom locations, and to expose at said bore a limited arc of the elastomeric material between severed parts of said clamp ring, thereby defining plural resiliently mounted arcuate clamp feet within said ring body.

2. The method according to claim 1, in which said clamp ring is a cylindrical annulus longitudinally channelled on its outer surface to define the grooves, whereby the clamp feet are characterized by relatively extensive arcuate surfaces.

3. The method according to claim 1, wherein said last-defined boring step is to a diameter less than the shaft diameter, whereby initial interference to shaft insertion is resiliently backed and, upon shaft insertion, each foot develops two resiliently loaded line contacts with the shaft.

4. The method according to claim 1, wherein the axial ends of said clamp ring are chamfered at the bore thereof, the chamfer extending to an outer diameter beyond that to which the last-defined boring operation is performed, whereby at each axial limit of the composite ring structure, a circumferentially continuous elastomeric shaft-hugging seal is defined.

5. The method of claim 1, in which the clamp ring is a corrugated metal annulus wherein the grooves are defined by the outwardly facing peripheral undulations thereof.

6. The method of making a molded annular ring with like angular spaced metal segments on the inner surface thereof at a predetermined bore diameter, which comprises selecting a metal ring of inner dimension less than said predetermined bore diameter of said inner surface, said ring having plural angularly spaced grooves of depth extending to less than said predetermined diameter, molding said ring at the bore of a ring of elastomeric material, and then boring the resulting composite structure to a diameter sufficient to sever said ring at groove-bottom locations, and to expose at said bore a limited arc of the elastomeric material between severed parts of said clamp ring, thereby defining plural resiliently mounted and angularly spaced arcuate metal segments within the annular ring.

7. The method of claim 1, wherein said first-mentioned ring body is an inner ring having a circumferentially extending bearing raceway on the outer surface thereof and about a central axis, and wherein said rigid clamp ring is positioned concentrically within the bore of said first-mentioned ring body during the embedding step, and further wherein the boring step is performed concentrically with said axis.

References Cited

UNITED STATES PATENTS

| | | | |
|---|---|---|---|
| 629,395 | 7/1899 | Sargent | 29—149.5 X |
| 1,643,977 | 10/1927 | Buckwalter | 29—148.4 X |
| 2,982,999 | 5/1961 | Stewart | 29—148.4 X |
| 3,061,386 | 10/1962 | Dix et al. | 29—148.4 X |
| 3,335,481 | 8/1967 | Haentjens | 29—529 X |
| 3,348,289 | 10/1967 | Marsh | 29—149 |
| 3,382,567 | 5/1968 | Schaeffler | 29—149 |

WAYNE A. MORSE, JR., Primary Examiner

U.S. Cl. X.R.

29—527.6, 148.4, 149.5